United States Patent [19]

Freeman

[11] Patent Number: 5,396,284
[45] Date of Patent: Mar. 7, 1995

[54] MOTION DETECTION SYSTEM

[75] Inventor: Edward J. Freeman, Lancaster, Pa.

[73] Assignee: Burle Technologies, Inc., Wilmington, Del.

[21] Appl. No.: 110,050

[22] Filed: Aug. 20, 1993

[51] Int. Cl.⁶ .............................................. H04N 7/18
[52] U.S. Cl. .................................... 348/154; 348/155
[58] Field of Search ............................... 348/154, 155; H04N 7/18

[56] References Cited

U.S. PATENT DOCUMENTS

| | | | |
|---|---|---|---|
| 3,488,436 | 1/1970 | Burney | 348/155 |
| 3,988,533 | 10/1976 | Mick | 348/155 |
| 4,112,463 | 9/1978 | Kamin . | |
| 4,458,266 | 7/1984 | Mahoney . | |
| 4,651,211 | 3/1987 | Weckenbrock et al. . | |
| 4,894,716 | 1/1990 | Aschwanden et al. . | |
| 4,963,961 | 10/1990 | Willoughby | 348/155 |
| 5,008,745 | 4/1991 | Willoughby . | |
| 5,083,202 | 1/1992 | Parke . | |
| 5,206,723 | 4/1993 | Parke . | |

Primary Examiner—Howard W. Britton
Attorney, Agent, or Firm—Dann, Dorfman, Herrell and Skillman

[57] ABSTRACT

A system for detecting motion in a video image is provided wherein the video image is processed into a statistical array in which the array elements are derived from overlapping portions of the image. The elements of the statistical array are compared with corresponding array elements derived from an earlier image. The overlapping nature of the statistical array elements allows any detected changes in the image to be correlated with a portion of the image that is smaller than the area from which the statistical quantities are derived. Such spatial correlation of detected image changes is accomplished by thresholding and/or Boolean comparisons among the elements of the statistical array. A motion detection system in accordance with this invention can be used with a video multiplexing system so that motion can be detected at a plurality of remote locations.

21 Claims, 5 Drawing Sheets

MOTION DETECTION SYSTEM

FIELD OF THE INVENTION

The present invention relates to a system for detecting movement between successive video images. More particularly, the invention relates to a system for providing improved spatial resolution of motion detection while also providing reduced sensitivity to minor variations in successive images.

BACKGROUND OF THE INVENTION

Video motion detection systems are known in which a comparison is made between a live video image and a stored representation of an earlier video image in order to detect relative motion between the two signals on the basis of a difference between the live and stored images. In order to reduce the information storage and processing overhead needed to compare video images, and to reduce sensitivity to relatively minor fluctuations between images, a live video signal can be analyzed to produce a first statistical quantity that is then compared to a second statistical quantity that is representative of a previous video signal.

U.S. Pat. No. 4,894,716, assigned to Burle Technologies, Inc., the assignee of the present application, describes a motion detection system wherein the positions of edges of objects within a live video image are compared with stored data relative to edge positions within the image at an earlier time. In that motion detection system, sensitivity to minor changes is reduced by detecting changes over several adjacent horizontal portions of an image before an alarm is activated. In general, increasing the size of portions of the image from which image statistics are extracted and compared reduces sensitivity to minor or spurious image changes.

In addition to detecting whether motion has occurred, it would be desirable for a video motion detection system to determine the location or locations within the video image where motion is detected. Such capability could be used, for example, to produce an alarm in response to detecting motion within a selected portion or portions of the image while ignoring motion within other non-selected portions of the image. It would further be desirable to provide such a motion detection system in which the spatial resolution is high enough to allow precise definition of the selected area or areas that are analyzed for motion and the selected area or areas that are to be ignored. However, improvement of the spatial resolution of motion detection has heretofore been in conflict with the extraction of sufficient relevant statistical quantities from a relatively large portion of the image in order to reduce sensitivity to minor or insignificant changes.

SUMMARY OF THE INVENTION

According to one aspect of the invention, a video image is processed into a statistical array wherein elements of the array are derived from overlapping portions of the image. The statistical array is obtained by deriving a first set of statistical array elements pertaining to a first set of segments of a horizontal scan line or lines of the video image and a second set of statistical array elements pertaining to a second set of horizontal scan line segments that are horizontally shifted relative to the first set of horizontal scan line segments. The first and second sets of scan line segments are taken from successive scan lines within a single video field or frame. Alternatively, the first and second sets of scan line segments are taken from a single scan line. Each statistical array element pertains to a single horizontal scan line segment or to a group of scan line segments that are geometrically arranged to define an area of the image.

According to another aspect of the invention, a video image is processed into a statistical array in which each array element contains a statistical quantity pertaining to a discrete area of the image. The statistical array includes a first set of statistical array elements pertaining to a first set of mutually exclusive image areas and a second set of statistical array elements pertaining to a second set of image areas that at least partially overlap the first set of image areas. The statistical array is compared with a previously-generated statistical array to determine whether a change has occurred between corresponding array elements. The overlapping nature of the statistical array elements allows any detected image changes to be correlated with a portion of the image that is smaller than the area from which the statistical quantities are derived. Correlation of such statistical changes with particular portions of the image is accomplished by a non-linear procedure that includes thresholding and/or Boolean comparisons among the elements of the statistical array.

According to another aspect of the invention, a video motion detection system having improved spatial resolution is arranged to cooperate with a video multiplexing system wherein a plurality of cameras is monitored to detect, for example, unauthorized intrusion into one or more physical locations. The motion detection system according to this invention provides enhanced monitoring by alerting the operator to the presence of motion within one or more of the locations and/or causing the multiplexing system to record signals from cameras on a priority basis associated with the detection of motion within the signals from such cameras with a degree of accuracy and reliability not heretofore achieved by the known motion detection systems.

BRIEF DESCRIPTION OF THE DRAWINGS

The novel aspects of the present invention, as well as other features and advantages of the present invention, will be made apparent herein with reference to the appended drawings in which.

DETAILED DESCRIPTION OF THE PREFERRED EMBODIMENTS

Figure 1:
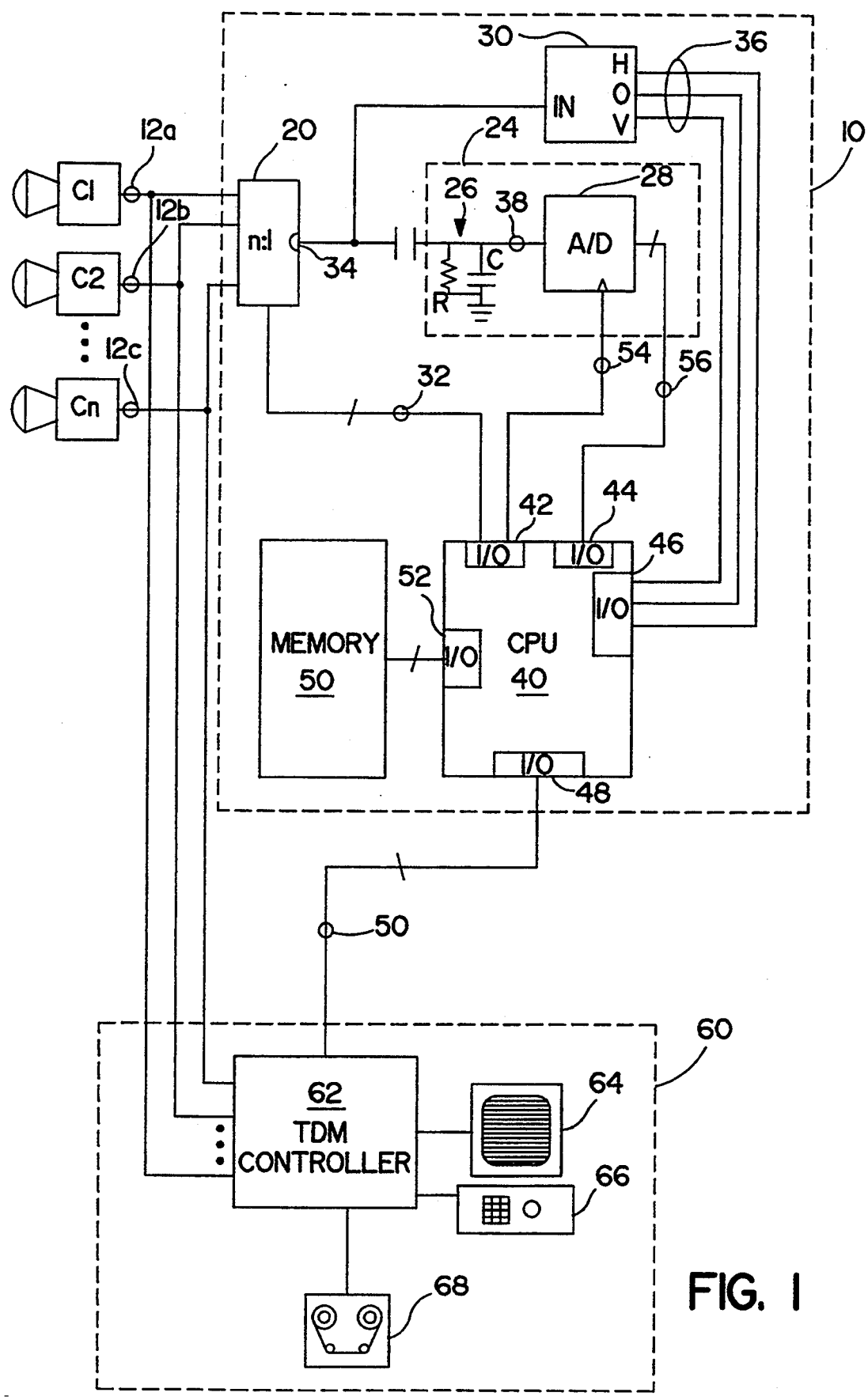
FIG. 1 is a block diagram of a video motion detection system according to the present invention in use with a video time-division multiplexing system.

Referring now to FIG. 1, there is shown a motion detection system 10 and a video time-division multiplexing (TDM) system 60. Video signals are supplied to the motion detection system 10 and the TDM system 60 from a plurality of cameras Cl-Cn via video signal lines 12a-c. The cameras Cl-Cn are positioned in a known manner at one or more remote locations that are to be monitored. The TDM system 60 includes at least one monitor 64 for viewing the video images from cameras Cl-Cn; a user interface device, such as a keyboard 66 for providing operator input; and a recording unit 68 for recording video signals. A TDM controller 62 is operably interconnected with the video signal lines 12a-c, the monitor 64, the keyboard 66, and the recording unit 68 in order to direct video signals from the cameras to the monitor 64 and/or the recording unit 68 in a manner specified by the operator of the TDM system 60. For example, the TDM controller can sequentially supply video signals to the monitor 64 in accordance with a display sequence specified by the operator. The TDM controller 62 can also provide other functions such as generating a compound display on the monitor 64 wherein images from selected cameras are compressed and displayed simultaneously within selected portions of the monitor screen. The TDM controller 62 is also capable of encoding video signals from the cameras to produce a time-division multiplexed video signal that can be recorded by the recording unit 68.

The motion detection system 10 includes a CPU 40 for receiving and comparing video statistics and for generating alarm signals, a memory 50 for storing data, a multiplexer 20 for selecting a video signal for motion analysis, a sampling circuit 24 for generating the video statistics, and a sync stripper 30 for extracting timing information from the selected video signal. The CPU 40 may include a suitable microcontroller, such as a Motorola 68HC11F1.

The CPU 40 includes an I/O interface 48 for communicating with the TDM controller via signal line 50. I/O interface 48 permits the microprocessor 40 to communicate with the TDM system 60 when motion has been detected and to identify the camera from which motion was detected. In a preferred mode of operation, when the CPU 40 signals that motion has been detected, the TDM controller 62 departs from the previously specified scanning sequence and causes the image from the identified camera to be displayed continuously upon the monitor 64 or recorded continuously by the recording unit 68. If more than one camera is identified as a source of motion, the TDM controller 62 then displays images from each such camera in accordance with an operator-specified, camera priority ranking. The I/O port 48 of the CPU 40 preferably includes a latching mechanism so that communication between the CPU 40 and the TDM controller 62 can be conducted asynchronously.

The I/O port 48 is preferably bi-directional so that the CPU 40 can receive data from the TDM controller 62 via signal line 50. Such data includes a list of cameras specified as active by the operator via the keyboard 66, a bitmap for each camera identifying a region or regions of the video image in which motion is to be detected and an image region or regions in which motion is to be ignored, and sensitivity values corresponding to the sensitivity with which motion is to be detected.

Operation of the motion detection system 10 proceeds generally as follows. The CPU 40 selects a camera from the list of active cameras and generates a number corresponding to the selected camera. This number is communicated to the multiplexer 20 as an address via address line 32 which interconnects I/O port 42 of the CPU 40 with the multiplexer 20. The multiplexer then selects the signal line 12a-c corresponding to the specified address and provides the video signal from the selected video signal line at an output port or terminal 34. In the preferred embodiment, as many as 16 cameras are connected to the multiplexer 20 which includes two (2) MAX455 8:1 CMOS video multiplexer/amplifiers which are cascaded with a single MAX453 2:1 CMOS video multiplexer/amplifier. The MAX455 and MAX453 video multiplexer/amplifiers are manufactured by Maxim Integrated Products of Sunnyvale, Calif. Address line 32 is preferably a four bit address line having three bits connected in parallel with the 8:1 multiplexers and one bit connected with the 2:1 multiplexer.

Terminal 34 of multiplexer 20 is connected with the input of sync stripper 30. The sync stripper 30 is preferably an LM1881 video sync separator manufactured by National Semiconductor. The sync stripper 30 extracts the horizontal and vertical synchronization portions of the incoming video signal and also provides an indication of whether an odd or even field is present at the input. The horizontal and vertical sync signals, as well as the odd/even indicator, are communicated to I/O port 46 of the CPU 40 via signal lines 36. The signals communicated to the CPU 40 via lines 36 are used by the CPU 40 to determine the presence of a video signal and to correlate the incoming video signal with the position within a scanning field to which the instantaneous video signal pertains.

The video signal present at terminal 34 of multiplexer 20 is capacitively coupled to the statistical sampling circuit 24. In the preferred embodiment, the statistical sampling circuit includes an averaging filter 26 that generates average values of the incoming video signals. In FIG. 1, the averaging filter 26 is embodied as an analog low pass filter comprising an RC circuit that provides a time-weighted continuous average of the analog video signal at terminal 38. The RC filter is designed to operate according with a time constant that is commensurate with the desired length of the horizontal scan line segment.

The statistical sampling circuit 24 also includes an analog-to-digital (A/D) converter 28 such as the TL5501 6-bit analog-to-digital converter manufactured by Texas Instruments of Dallas, Texas. Analog-to-digital converter 28 includes a clock input which is connected via signal line 54 with I/O port 42 of the CPU 40. Whenever the A/D converter 28 receives a clock signal from CPU 40 over line 54, the A/D converter samples the average signal level present at terminal 38 and produces a digital value that is representative of the averaged signal. The digital value is provided by A/D converter 28 over signal lines 56 which are connected with I/O port 44 of the CPU 40.

After the CPU 40 has selected a camera, the CPU 40 waits until a vertical sync signal is received via I/O port 46. When the CPU 40 detects a vertical sync signal, indicating the beginning of a field, and a horizontal sync signal indicating the first line of the field, CPU 40 may begin to periodically signal the A/D converter 28 to sample the average signal value provided by the statistical sampling circuit 24. The sampling period is selected to correspond to the desired scan line segment length. The A/D converter 28 transmits the numerical averages corresponding to the horizontal scan line segments to the CPU via port 44. These average values are used by the CPU 40 to convert the incoming video image to an n×m array of statistical values.

Figure 2:
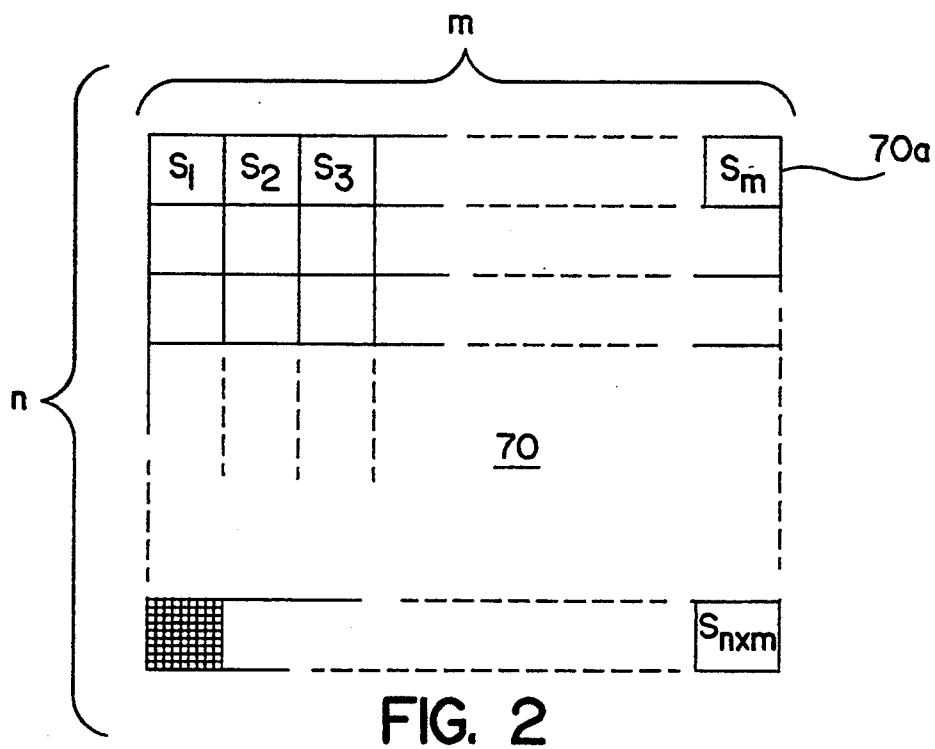
FIG. 2 is a diagram of a statistical array generated by the motion detection system of FIG. 1.

Referring now to FIG. 2, there is shown a statistical array 70 of the type produced by the CPU 40 operating in accordance with the present invention. Each element, $S_x$, of the array 70 represents a statistical value that corresponds to a portion of the video image. In the preferred embodiment the statistical array 70 is a 16×16 element array wherein each element of the array is a sum of averages of several vertically aligned horizontal scan line segments. In other embodiments, the statistical sampling circuit 24 could be designed to produce other types of statistical quantities for the statistical array elements, $S_x$, for example, such quantities as moments of the signal value distribution, minimum and/or maximum values of the value distribution, the number of edges, the entropy of a digital sequence, or similar statistical values about the coefficients of orthogonal transformations of the video signal. Regardless of the nature of the statistical quantity that is used, the sensitivity of the statistical quantities to minor or insignificant signal fluctuations will decrease as the size of the portion of the image from which the statistical quantities are derived increases.

When an incoming video signal has been converted by the CPU 40 into a statistical array, the CPU then retrieves a similarly-constructed statistical array from memory 50 via I/O port 52. The retrieved array is used as a reference to which the new statistical array is compared. The reference array is preferably a stored version of a previous statistical array derived from an earlier image produced by the most currently selected camera. The new statistical array is compared to the reference array and the result of the comparison is used to determine whether motion has occurred between the respective images. Such a comparison is effected, for example, by subtracting corresponding elements of the new statistical array from the reference array to produce a difference array. The CPU 40 then determines whether movement has occurred by detecting non-zero elements in the difference array. In order to reduce sensitivity to minor variations between the video images, the elements of the difference array are subjected to a non-linear procedure, such as comparison with a preselected threshold value. Thus, the elements of the new statistical array and the reference array must differ by a predetermined threshold before it is concluded that motion has occurred.

Such comparison and thresholding operations result in the production of an n×m action bitmap wherein each bit indicates the presence or absence of motion within a particular area of the image. In the preferred embodiment such an action bitmap is stored as thirty-two (32) 8-bit words. The presence of an asserted bit within any of these words is used to indicate to the TDM system that motion has occurred between successive images provided by the selected camera. Better yet, an additional comparison with an overlay or masking bitmap is performed prior to reporting the detection of motion.

The preferred TDM system provides a mode of operation wherein, for each of the remote camera images, the user can define an n×m overlay bitmap that defines a portion or portions of each image that will be used for motion detection and that also defines another portion or portions of each image which are to be ignored for purposes of motion detection. For example, in a security system wherein a remote camera is used to monitor a location at which automatically or continuously moving machinery is present, it would be useful to have the motion detection system ignore that part of the image wherein the moving machinery is located, and yet still be able to detect motion within other parts of the image. The user-specified action bitmap can be downloaded from the TDM controller 62 to the CPU 40 for storage in memory 50.

Figure 3:
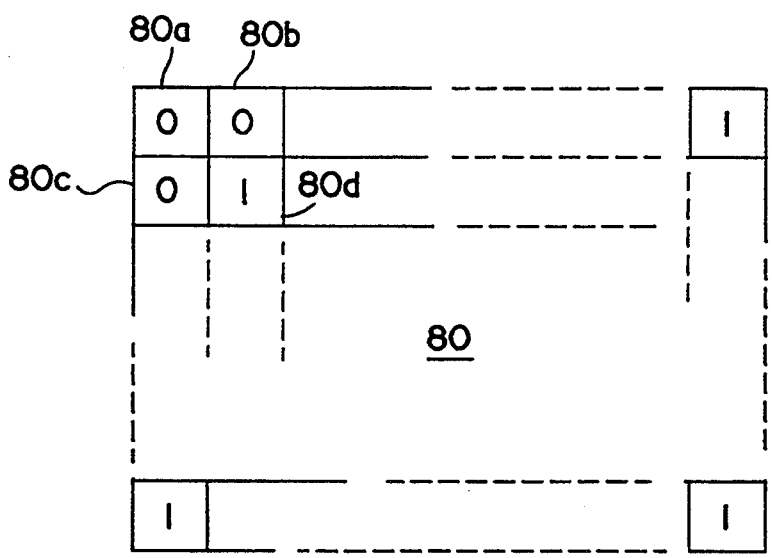
FIG. 3 is a diagram of a masking overlay by which elements of the statistical array of FIG. 2 for use in a motion detection system according to the present invention.

In FIG. 3 there is shown a preferred arrangement for an overlay bitmap 80. The overlay bitmap 80 includes non-asserted bits 80a, 80b, and 80c which indicate areas of the image which are to be ignored, and an asserted bit 80d, that indicates an area of the image for which motion detection is to be determined. In the preferred embodiment, the overlay bitmap 80 is stored in the form of thirty-two (32) 8-bit words.

When the CPU 40 has generated an action bitmap of an image corresponding to the video signal from the selected camera, the action bitmap can be logically ANDed with the overlay bitmap to mask off any asserted bits within the action bitmap that correspond to areas of the image which are to be ignored. Any asserted bits then remaining indicate that motion has occurred within a monitored location and the CPU 40 takes appropriate action such as by signaling an alarm and/or notifying the TDM controller 62 of the identity of the camera from which motion has been detected.

Figure 4:
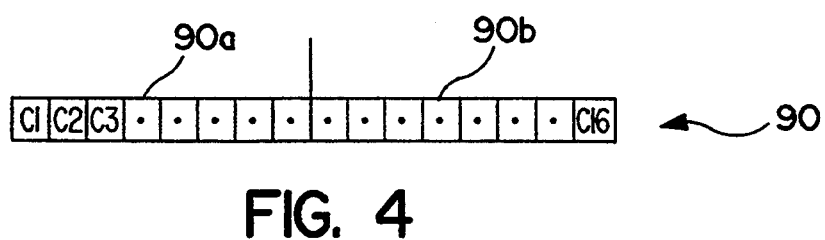
FIG. 4 is a memory map of a register by which the motion detection and time-division multiplexing systems of FIG. 1 may exchange data.

In the preferred embodiment, the CPU 40 indicates to the TDM controller 62 that motion has been detected within a particular camera signal by asserting a bit in a static, notification register containing a 1-bit entry for each camera. Such a notification register is arranged as shown in FIG. 4 wherein a register 90 contains two 8-bit words 90a and 90b for indicating the detection of motion between successive images provided by any one up to sixteen (16) cameras, each bit corresponding to one of the cameras. The notification register is preferably incorporated into I/O port 48 of the CPU 40, shown in FIG. 1. The communication link between CPU 40 and the TDM controller 62 also includes various handshaking and status signals to permit asynchronous communication between the TDM controller 62 and the CPU 40.

Figure 6:
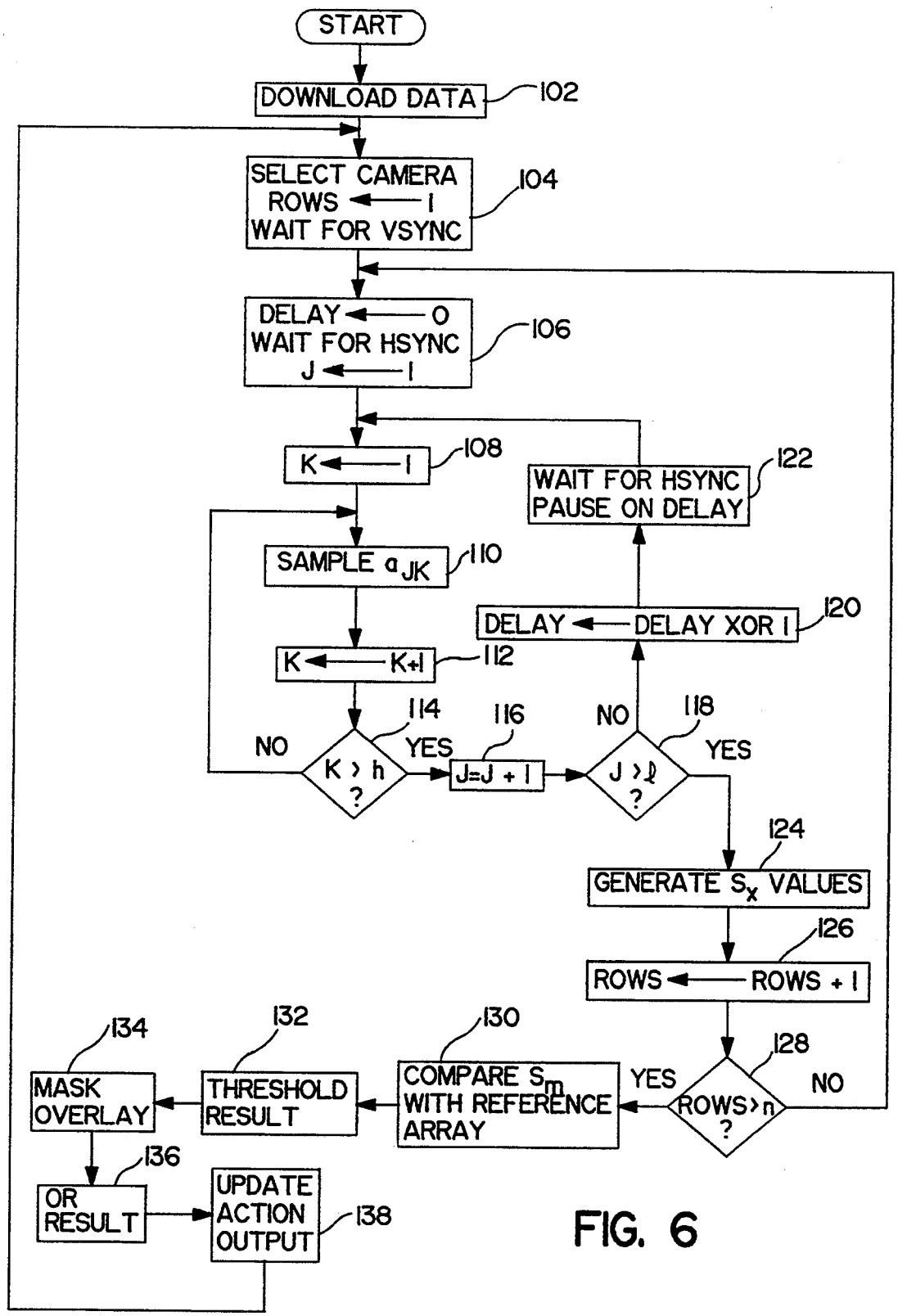
FIG. 6 is a logical flow diagram of a method of operating the motion detection system of FIG. 1.

Referring now to FIG. 6, there is shown in an example of a procedure by which the motion detection system 10 operates, and more particularly, the manner in which a desired statistical array is constructed in accordance with the present invention. After start-up, the CPU 40 is prepared, in step 102, to accept a variety of operational data from the TDM controller 62. Such operational data includes a list of active cameras, a set of overlay bitmaps corresponding to each of the active cameras, and a sensitivity threshold for each of the active cameras. In standalone applications wherein the motion detection system 10 is not used in conjunction with a TDM system, the CPU 40 would receive such operational data from a non-volatile memory such as a read only memory or via an appropriate user interface.

Proceeding to step 104, the CPU 40 selects an active camera from the list of active cameras. Also in step 104, a loop counter, ROWS, used in the production of the statistical array is initialized to 1. The CPU 40 then waits for vertical sync signal (VSYNC) that indicates the beginning of a field of a frame generated by the selected camera. The CPU then proceeds to execute step 106.

If desired a timing loop can be incorporated into step 104 so that when the CPU has waited for a new frame for a period of time that exceeds the time duration of a video frame, the CPU signals the TDM system 60 to indicate that it has lost the signal from the selected camera. The CPU 40 then selects the next camera from the active list.

In step 106, a delay flag, DELAY, is initialized to 0. The delay flag is used to provide the overlapping or shifted arrangement of the statistical array relative to portions of the video image in a manner that will be made apparent hereinbelow. In step 106 the CPU 40 waits for a horizontal sync signal (HSYNC) of the incoming image. When the horizontal sync is detected, a sampling index counter, J, is initialized to 1. In step 108, another index counter, K, is initialized to 1. The index counters J and K are used during the construction of each row of the statistical array to index an array of statistical samples from which the elements of each row of the statistical array are derived. The index counters J and K are also used to control a sampling loop during which a plurality of statistical samples of horizontal scan line segments are accumulated. These index counters may be initialized to values other than 1 depending on whether the current field is an even field or an odd field since, in the NTSC video standard, the image scanning origin alternates positions between odd and even fields.

Proceeding from step 108, the CPU 40 executes step 110 wherein a statistical sample, $a_{jk}$, is obtained from the statistical sampling circuit 24. Then, in step 112, the index counter K is incremented by 1 and the CPU 40 proceeds to step 114.

In step 114, the index counter K is compared with a constant h which represents the maximum number of horizontal scan line segments that are to be sampled within each horizontal scan line. If, in step 114, the value of K does not exceed h, then the CPU 40 returns to step 110 to take the next sample. Steps 110, 112 and 114 are repeated cyclically until samples $a_{1l}$ to $a_{1h}$ have been taken.

Eventually, in step 114, K is incremented to a value that exceeds h, the maximum number of samples to be taken for each scan line, and the CPU 40 proceeds to step 116 wherein the index counter J is incremented by 1. In step 118, a test is made to compare the index counter J with a constant 1 which represents the number of sampled scan lines that correspond to a row of the statistical array 70. If this number has not been reached, then the CPU 40 proceeds to step 120.

In step 120 the delay flag (DELAY) is toggled to the logical complement of its then present condition, such as by an exclusive-OR comparison with a logical 1 as shown. Then, in step 122, the CPU 40 waits to receive the next horizontal sync signal from the sync stripper 30 in order to initiate sampling of the next scan line. If, in step 122, the delay flag is set at 1, then the CPU pauses for a predetermined delay interval before proceeding to take the next row of samples. By toggling the delay flag in step 120 and then delaying the sampling of alternating rows in step 122, a sampling structure is achieved wherein samples taken from alternating lines represent segments of the horizontal scan line that are horizontally shifted with respect to the scan segments of vertically adjacent scan lines. The sampling structure can be better understood with reference to FIG. 5.

Figure 5:
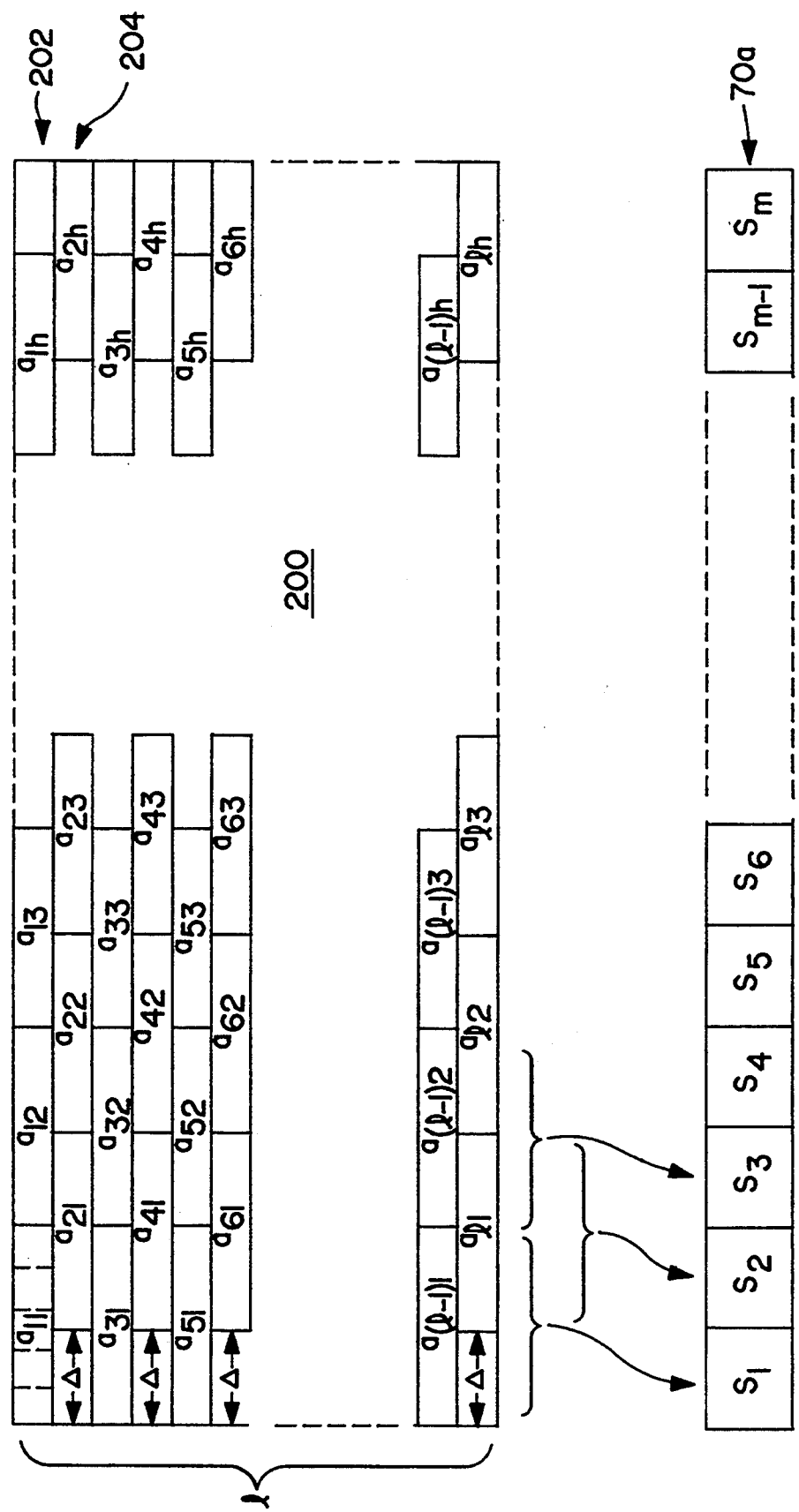
FIG. 5 is a diagram of a sampling structure utilized by the motion detection system of FIG. 1 and its relationship to the statistical array of FIG. 2.

As shown in FIG. 5, the sampling structure 200 comprises a plurality of statistical samples $a_{jk}$, each of which represents a horizontal scan line segment within the video image. The sampling structure 200 contains 1 rows, each of which contains h samples, $a_{jl}$–$a_{jh}$. The odd rows of the sampling structure 200, such as row 202, contain statistical samples that are taken at uniform intervals beginning at the left edge of the image. The even rows of the sampling structure 200, such as row 204, contain statistical samples taken at uniform intervals, but the origin of the even rows is shifted horizontally by a distance $\Delta$ from the left edge of the image. During the motion detection procedure, the samples $a_{jk}$ are taken and stored, preferably in a cache memory internal to the CPU 40, until the conditions "J>1" and "K>h" are satisfied.

Referring back to FIG. 6, it can be seen that when J is greater than 1, the CPU 40 proceeds to step 124 wherein the values $S_x$ corresponding to a row of the statistical array 70 are generated from the samples $a_{1l}$–$a_{1m}$. In the preferred embodiment, a row of statistical array elements, $S_l$–$S_m$, is derived from the samples $a_{1l}$–$a_{1h}$ according to the formula: The physical interpretation of this summation is better understood with reference to FIG. 5 wherein a $$S_m = \begin{cases} \sum_{n=1}^{1/2} a_{(2n-1)(\frac{m+1}{2})}, & m \text{ odd} \\ \sum_{n=1}^{1/2} a_{(2n)(\frac{m}{2})}, & m \text{ even} \end{cases}$$

row 70a containing statistical array elements $S_l$–$S_m$ is shown below the sampling structure 200. Each element $S_x$ of row 70a is a sum of vertically aligned statistical image samples $a_{jk}$. Due to the horizontally shifted nature of alternating rows of samples $a_{jk}$, the statistical array elements are, in effect, derived from overlapping portions of the image. Horizontal resolution is enhanced within the statistical array because 2h distinct statistical array elements are generated for every h horizontal scan line segments.

Referring again to FIG. 6, it can be seen that after a row of statistical array elements $S_x$ has been generated in step 124, the CPU 40 proceeds to step 126 wherein the current value of the loop counter ROWS is incremented by 1. Then, in step 128 it is determined whether the total number of rows for the statistical array, n, has been reached. If, in step 128, the then current value of the loop counter ROWS does not exceed n, then the CPU 40 returns to step 106 and begins the process of deriving the next row of the statistical array 70.

If, in step 128, the statistical array has been completed, i.e., ROWS>n, then the CPU 40 proceeds to step 130. In step 130, each element $S_x$ of the statistical array is compared with a corresponding element of a reference array, such as a previously-generated statistical array corresponding to the selected camera. Concurrent with the comparison of step 130, the statistical array may itself be stored for subsequent use as a reference array. The comparison performed in step 130 is implemented, for example, as a subtraction of the reference array from the statistical array. The results of the subtraction operation are held in a difference array. In step 132, the absolute value of each of the elements of the difference array is compared to a preselected threshold value. Such thresholding is a non-linear operation resulting in an n×m action bitmap indicating portions of the image in which motion has been detected. In steps 134, 136, and 138, the action bitmap is masked, remaining asserted bits are detected, and an appropriate indication of detected motion is generated as described previously. The CPU 40 then returns to step 104 to select the next camera in the active list and so continues to detect motion in the video images from each of the other active cameras.

It is noted that the sequence of operations described in connection with FIG. 6 may be altered from that shown in order to take advantage of the particular performance characteristics of the available memory and type of processor employed in a given physical embodiment. For example, rather than collecting a plurality of samples $a_{jk}$ before generating the statistical array elements $S_x$, it may be advantageous to accumulate the array elements concurrently within the sampling loop. Similarly, the comparison and thresholding operations may be conducted concurrently with the accumulation of the statistical array elements. Such selections can be made by those skilled in the art on the basis of the relative memory access time and processor speed. Many operable embodiments are possible wherein the overlapping, or horizontally shifted, nature of the statistical array elements with respect to the corresponding portions of the image is preserved.

EXAMPLE I

Figure 7:
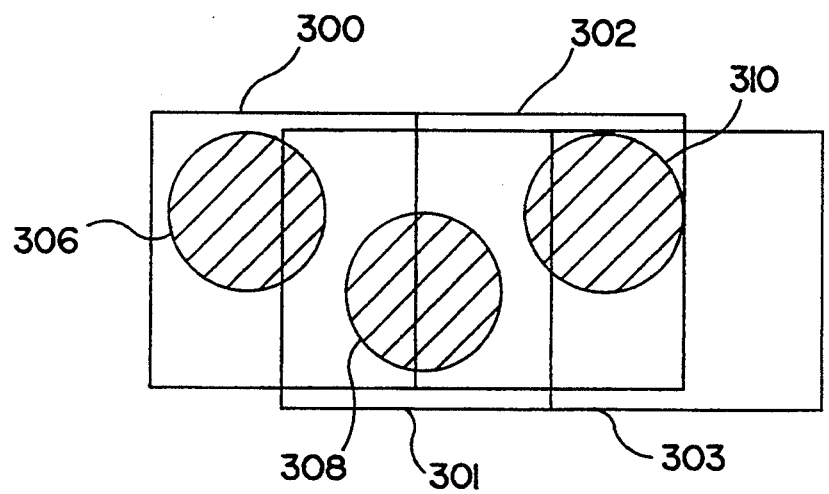
FIGS. 7 and 8 are diagrams illustrating the manner in which spatial resolution of motion detection may be enhanced via the use of the sampling structure of FIG. 5.

The enhancement of spatial resolution provided by the motion detection system of this invention can be better appreciated with reference to FIG. 7 wherein the blocks 300 and 302 represent adjacent portions of a video image that are used to generate two successive odd statistical array elements. The blocks 301 and 303 represent adjacent portions of a video image that are shifted relative to blocks 300 and 302, as are used to generate successive even statistical array elements. The shaded circles 306, 308 and 310 represent changes in the video image in excess of a selected threshold. In a known motion detection system utilizing non-overlapping portions of the image, such as blocks 300 and 302, the only events that would be detected would be those events that are represented by shaded regions 306 and 310 because they occur entirely within the boundaries of blocks 300 and 302, respectively. An event, such as that represented by shaded region 308, although exceeding the predetermined threshold, would remain undetected in the known non-overlapping statistical array structure because the image change represented by shaded region 308 is distributed between the non-overlapping blocks 300 and 302 and thus would not contribute to a large enough difference to exceed the detection threshold within either block alone. However, the concurrent synthesis of overlapping analysis blocks 301 and 303 ensures detection of events, such as event 308, that go undetected in the non-overlapping analysis structure. Moreover, a detected event within an overlapping statistical array structure, as provided in accordance with the present invention, can be correlated more accurately with particular image locations without having to reduce the size of the image area that contributes to the synthesis of each statistical array event. Thus, the present invention provides significantly enhanced resolution of motion detection without an increase in susceptibility to insignificant or minor image-to-image variations.

EXAMPLE II

The non-linear comparison and thresholding procedures discussed thus far are but one example of the analysis procedure by which motion detection resolution can be enhanced by the motion detection system using shifted analysis areas in accordance with the present invention. Resolution can also be enhanced by comparing the elements of the statistical array, $S_x$, to the elements of the reference array to produce corresponding logical values, $L_x$, and then logically combining the logical values pertaining to logically adjacent elements of the overlapping statistical array. For example, in FIG. 8 there are shown representative adjacent non-overlapping portions 312 and 314 of a video image. Another portion of the image represented by block 316 partially overlaps blocks 312 at 314. In this example, the shaded regions 318 and 320 represent image changes exceeding the selected threshold. In the absence of overlapping image portion 316, both event 318 and event 320 would be detected, but the occurrence of these events could not be correlated to a position within the image with a resolution finer than the size of image portion 312. However, by including elements in the statistical array derived from overlapping image portion 312, a sequence of Boolean comparisons can be made among the resulting logical values $L_x$ in order to more precisely locate the occurrence of image changes without having to reduce the size of the image portions that contribute to each statistical array element $S_1$, $S_2$, and $S_3$. The logical values, $L_x$, corresponding to the statistical array elements can be thresholded and then combined according to the Boolean formulas shown in the action bitmap 322.

For example, the action bitmap element 324 having the formula $L_1L_2$ would be indicative of action such as event 318 occurring within the leftward region of image portion 312. Similarly, bitmap element 326 having the formula $L_3L_2$ would be indicative of action occurring within the rightward area of image portion 314. The inner elements of the action bitmap 322, bits 328 and 330, are synthesized according to a logical AND operation combining logical values corresponding to adjacent sequential image portions. Such logical operations can be readily implemented in software or hardware by those skilled in the art.

Figure 8:
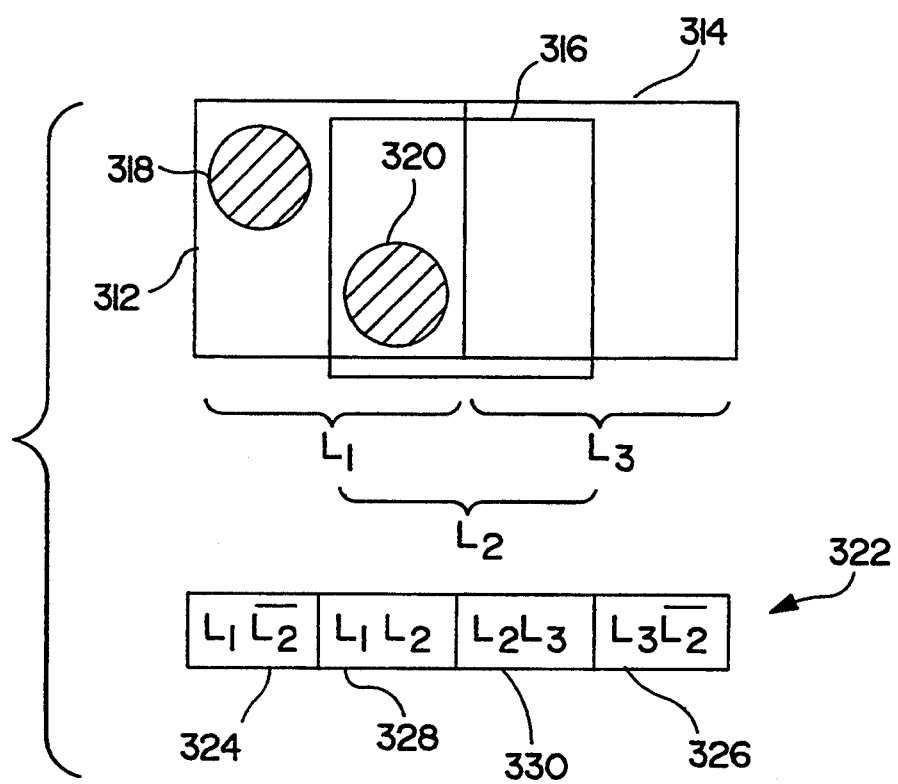

A beneficial result provided by the action bitmap synthesis procedure illustrated in FIG. 8 is that motion detection resolution can be effectively doubled by delaying the initiation of sample accumulation during alternating horizontal scan lines by a delay period of one-half the sampling time. Moreover, further enhancement of resolution can be achieved by delaying the initiation of sampling by integral sub-multiples of the sampling time over a larger number of horizontal scan lines. For example, sampling initiation can be delayed by one-third of the sampling interval for each of three successive horizontal lines of a video image in order to triple the motion detection resolution without having to reduce the size of the horizontal scan line segments from which statistical samples are extracted. Additionally, it may be desirable to employ a sampling structure that is based on "non-rectangular" geometry such as a hexagonal array or other plane-tiling geometries.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. An apparatus for detecting motion within video images comprising:
   (a) statistical means for deriving a first plurality of statistical values including a first value representative of a first portion of a video image, and a second value representative of a second portion of the video image, said second portion of the video image at least partially overlapping said first portion;
   (b) storage means for storing a second plurality of statistical values derived from a previous video image;
   (c) comparison means for comparing spatially corresponding statistical values of said first and second pluralities of statistical values and for signaling a difference determined between any of the spatially corresponding statistical values; and
   (d) motion indicating means responsive to the difference signal for indicating the detection of motion.

2. The apparatus of claim 1 wherein said comparison means includes:
   (a) threshold determining means for determining whether any of said first plurality of statistical values differs from a spatially corresponding statistical value of said second plurality of statistical values by a predetermined threshold value and for producing first and second logic values corresponding to each threshold determination; and
   (b) location determining means for receiving the first and second logic values and determining a location in the video image corresponding to a differing pair of spatially corresponding statistical values.

3. The apparatus of claim 1 wherein said comparison means includes:
   (a) threshold determining means for determining whether any of said first plurality of statistical values differs from a spatially corresponding statistical value of said second plurality of statistical values by a predetermined threshold value and for producing a logic value in response to each determination; and
   (b) location determining means for logically comparing said logical values and for determining a location in the video image corresponding to said differing statistical values in said logical comparison.

4. The apparatus of claim 1 wherein said storage means includes an addressable memory, the apparatus comprising:
   a plurality of video cameras for producing video images; and
   selecting means for selectively connecting one of said cameras with said statistical means and for producing an address corresponding to a storage location in said addressable memory;
   and wherein said comparison means includes selecting means responsive to said address for selecting said second plurality of statistical values associated with said selected one camera.

5. The apparatus of claim 1 wherein:
   said first value is derived from a plurality of vertically aligned first horizontal scan line segments of the video image;
   said second value is derived from a plurality of vertically aligned second horizontal scan line segments of the video image; and
   said first segments are displaced horizontally relative to said second segments by a distance less than the length of one of the segments.

6. The apparatus of claim 5 wherein said first value is derived from a plurality of statistical sample values of said first segments.

7. The apparatus of claim 6 wherein said statistical means comprises:
   a sampling circuit for producing said statistical sample values; and
   accumulating means for receiving said statistical samples and for accumulating said statistical sample values to produce said first and second values.

8. The apparatus of claim 7 wherein said sampling circuit comprises:
   an analog averaging filter connected for receiving said video image and providing a continuous time-weighted average of said video image; and
   an analog-to-digital converter connected with said analog averaging filter for sampling said time-weighted average and for providing said statistical sample values in response thereto;
   and delay means operatively connected with said accumulating means for causing said accumulating means to receive said statistical sample values at predetermined sampling intervals during a plurality of first horizontal scan lines and at relatively delayed intervals during a plurality of second horizontal scan lines to produce said relative horizontal displacement between said first horizontal scan line segments and said second horizontal scan line segments.

9. An apparatus for detecting motion within video images, the apparatus comprising:
   (a) sampling means for sampling scan lines of a video image and for producing sample values representative of segments of each of said scan lines;
   (b) initiating means for initiating said sampling means to produce a first plurality of sample values representative of a first plurality of the scan line segments;
   (c) delay means for selectively delaying said initiating means and causing said sampling means to produce a second plurality of sample values representative of a second plurality of the scan line segments, said second plurality of scan line segments being displaced relative to said first plurality of segments by an amount less than the length of one of said segments;
   (d) storage means for storing said first and second plurality of sample values;
   (e) comparison means for comparing said first and second plurality of sample values with spatially corresponding first and second pluralities of stored sample values derived from a previous video image; and
   (f) motion indicating means responsive to said comparison means for indicating the detection of motion.

10. The apparatus of claim 9 wherein:
    said second plurality of scan line segments defines a horizontally overlapping spatial region relative to said first plurality of scan line segments; and
    said comparison means produces first and second logical values indicating whether respective ones of said first and second pluralities of sample values differ from respective spatially corresponding stored values by a predetermined threshold and wherein said comparison means further comprises logical comparison means for logically comparing said first and second logical values and for responsively producing a third logical value indicating the presence of motion in said horizontally overlapping spatial region.

11. The apparatus of claim 9 wherein said sampling means comprises:
an analog filter for obtaining a time-weighted analog quantity, said analog filter having a preselected finite time constant; and
an analog-to-digital converter for sampling said analog quantity and for providing said sample values.

12. The apparatus of claim 11 wherein said analog filter is a low-pass filter and said time constant is selected to be commensurate with the scanning duration of said segments.

13. An apparatus for detecting motion at any one of a plurality of remote locations, comprising:
(a) a plurality of video cameras each producing a video signal corresponding to an image of one of said locations, said video signal comprising scan lines of said image and synchronization signals indicating the origin of each scan line;
(b) selecting means for selecting one of said video signals;
(c) synchronization means for isolating said synchronization signals of said selected video signal;
(d) accumulating means for accumulating a first plurality of statistical values pertaining to a first scan line of said video image and a second plurality of statistical values pertaining to a second scan line of said signal, said accumulating means having shifting means responsive to said synchronization means, for accumulating said second plurality of statistical values for shifted positions within said second scan line relative to said first plurality of statistical values;
(e) storage means for storing successive accumulated values associated with each of said plurality of video signals;
(f) comparison means for comparing said accumulated values with said stored values associated with said selected video signal; and
(g) indicating means for indicating a difference in said comparison, said indicating means including identifying means for identifying the selected video signal.

14. A method for detecting motion comprising the steps of:
receiving a video image;
generating a plurality of statistical values from said video image, said plurality of statistical values comprising:
a) a first statistical value corresponding to a first spatial region within the video image, and
b) a second statistical value corresponding to a second spatial region within the video image, said second spatial region at least partially overlapping the first spatial region;
comparing each of said first and second statistical values to spatially corresponding stored statistical values generated from a previous video image; and
signalling that motion has been detected when a difference is recognized between said statistical values and said stored values.

15. The method of claim 14 wherein said generating and comparing steps are conducted substantially concurrently.

16. The method of claim 14 wherein said comparing step comprises the steps of:
setting a first logical value indicating whether said first statistical value differs from said spatially corresponding stored statistical value by a predetermined threshold quantity;
setting a second logical value indicating whether said second statistical value differs from said spatially corresponding stored statistical value by a predetermined threshold quantity; and
setting a third logical value in accordance with a logical function of said first and second logical values;
and wherein said signalling step comprises the step of identifying that motion has been detected in response to said third logical value.

17. The method of claim 14 wherein said generating step comprises the steps of:
sampling said video image to yield a plurality of first sample values representative of horizontal scan line segments defining said first spatial region;
sampling said video image to yield a second plurality of sample values representative of horizontal scan line segments defining said second spatial region; and
calculating said first and second statistical values from respective ones of said first and second pluralities of sample values.

18. The method of claim 17 wherein said sampling steps each comprise the step of averaging a portion of said image corresponding to the respective horizontal scan line segments.

19. The method of claim 17 wherein:
each of said sampling steps are conducted at periodic sampling intervals;
said second plurality of sample values are sampled at sampling intervals that are delayed relative to the sampling intervals at which said first sample values are sampled.

20. The method of claim 19 said sampling steps each comprise the step of sampling a statistical measure representative of a horizontal scan line segment.

21. The method of claim 20 wherein said video image is presented in the form of a time-varying signal and said statistical measure is a time-weighted measurement taken according to a measurement time constant independent of said periodic sampling intervals.

* * * * *